United States Patent
Dai (10) Patent No.: US 6,619,823 B2
(45) Date of Patent: Sep. 16, 2003

(54) WHEELS WITH ILLUMINATING DEVICE

(76) Inventor: Ming-Li Dai, No. 130, Lane 141, Jia-Hou Rd., Da-Jia Town, Taichung Hsien (TW)

( * ) Notice: Subject to any disclaimer, the term of this patent is extended or adjusted under 35 U.S.C. 154(b) by 0 days.

(21) Appl. No.: 09/917,626

(22) Filed: Jul. 31, 2001

(65) Prior Publication Data

US 2002/0024816 A1 Feb. 28, 2002

(30) Foreign Application Priority Data

Aug. 11, 2000 (TW) ........................ 89213932 U (51) Int. Cl.$^7$ ................................. B60Q 1/26
(52) U.S. Cl. .................. 362/500; 362/192; 280/816; 301/5.305
(58) Field of Search ................. 362/103, 500, 362/545, 192, 193; 310/73; 301/5.305, 5.309; 280/816

(56) References Cited

U.S. PATENT DOCUMENTS

| | | | | |
|---|---|---|---|---|
| 5,536,026 A | * | 7/1996 | Pozzobon et al. | 362/500 |
| 5,552,972 A | * | 9/1996 | Rezvani | 362/500 |
| 5,580,093 A | * | 12/1996 | Conway | 362/500 |
| 5,718,499 A | * | 2/1998 | Caro | 362/500 |
| 5,810,450 A | * | 9/1998 | Tsu et al. | 362/500 |

* cited by examiner

Primary Examiner—Stephen Husar
(74) Attorney, Agent, or Firm—Rosenberg, Klein & Lee (57) ABSTRACT

A wheel having an illuminating device includes an illuminating assembly with a ring-shaped magnet located in a center of the illuminating assembly. The ring-shaped magnet has a central hole and two flexible bushes are respectively engaged with the central hole from two sides of the ring-shaped magnet. The ring-shaped magnet is located between two bearings. Two wheel frames clamp the illuminating assembly positioned and a shaft extends through the two flexible bushes. Each of the wheel frames has apertures for receiving the illuminating items.

5 Claims, 11 Drawing Sheets

WHEELS WITH ILLUMINATING DEVICE

FIELD OF THE INVENTION

The present invention relates to a structure for a wheel having an illuminating device engaged therewith and the assembly processes for the wheel is simply and conductive wires between the LEDs or illuminating diodes and the coil are secured.

BACKGROUND OF THE INVENTION

Figure 11:
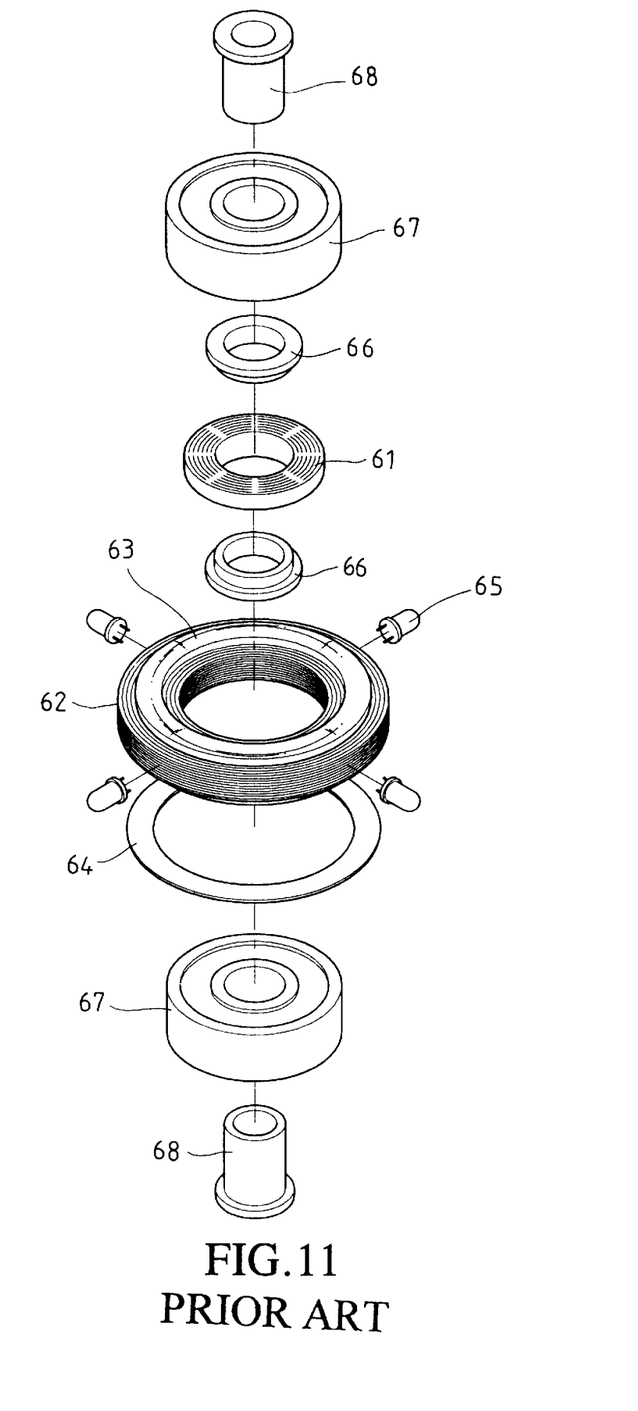
FIG. 11 is an exploded view to show a conventional illuminating wheel.
Figure 12:
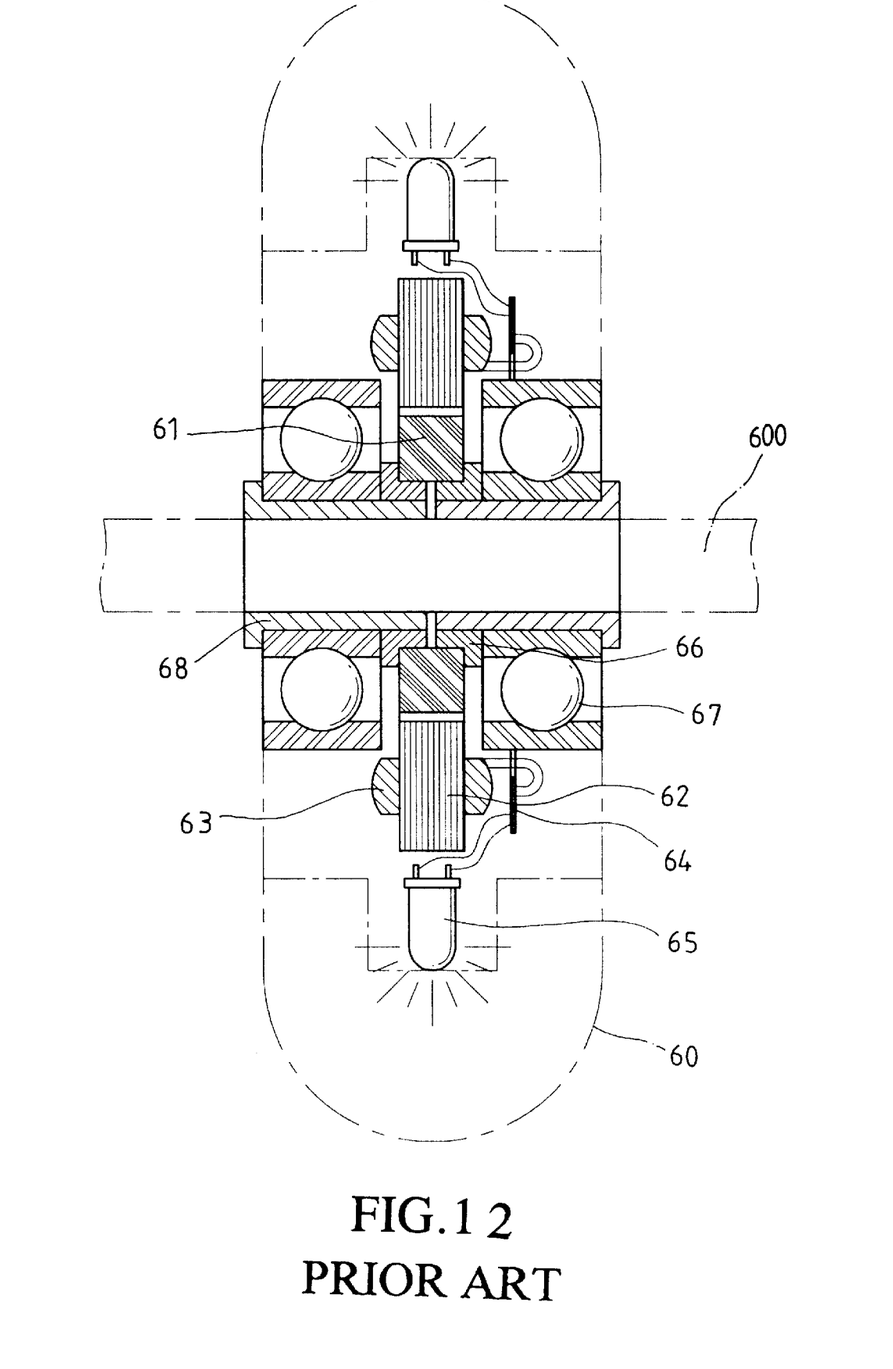
FIG. 12 is a cross sectional view to show the conventional illuminating wheel.

A conventional illuminating wheel is shown in FIGS. 11 and 12 and generally includes a coil 62 with two electrode rings 63 connected to two sides of the coil 62. A conductive ring 64 is connected to the two electrode rings 63 and illuminating diodes 65 or LEDs are connected to the conductive ring 64. A ring-shaped magnet 61 is located between two bearings 67 and two isolation bushes 66 are respectively engaged with two sides of the ring-shaped magnet 61 to position the ring-shaped magnet in position. Two positioning bushes 68 are respectively engaged with the two respective bearings 67. The assembly mentioned above is then enclosed in a wheel 60 with the illuminating diodes 65 being visible and a shaft 600 extends through the two positioning bushes 68. When the wheel 60 is rolling, the relative rotational movement between the stationary ring-shaped magnet 61 and the coil 62 provides electricity to the illuminating diodes 65. Two shortcomings of the conventional illuminating wheel is experienced, one of which is that the connection of the illuminating diodes 65, the conductive ring 64 and the electrode rings 63 are not well protected so that the wiring could be disengaged. The other shortcoming is that the assembling processes is complicated and the coil 62 is easily to be accessible by moist or water drops.

The present invention intends to provide a wheel with an illuminating device and the illuminating device is easily and securely to be engaged with the wheel.

SUMMARY OF THE INVENTION

In accordance with one aspect of the present invention, there is provided a wheel having an illuminating device and comprising an illuminating assembly which has a first ring and a coil is mounted to an outer periphery of the first ring. An isolation member is covered onto the coil. Two positioning rings are engaged with two sides of the first ring and a plurality of illuminating items are connected to the positioning rings and wired with the coil. A ring-shaped magnet has two flexible bushes respectively engaged with a central hole from two sides of the ring-shaped magnet. The ring-shaped magnet is located between two bearings with a shaft extending therethrough. Two wheel frames clamp the illuminating assembly and at least one of the wheel frames has apertures defined therethrough so that the illuminating items are inserted into the apertures.

The primary object of the present invention is to provide a illuminating wheel wherein the coil is well protected and the assembling processes are simple.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
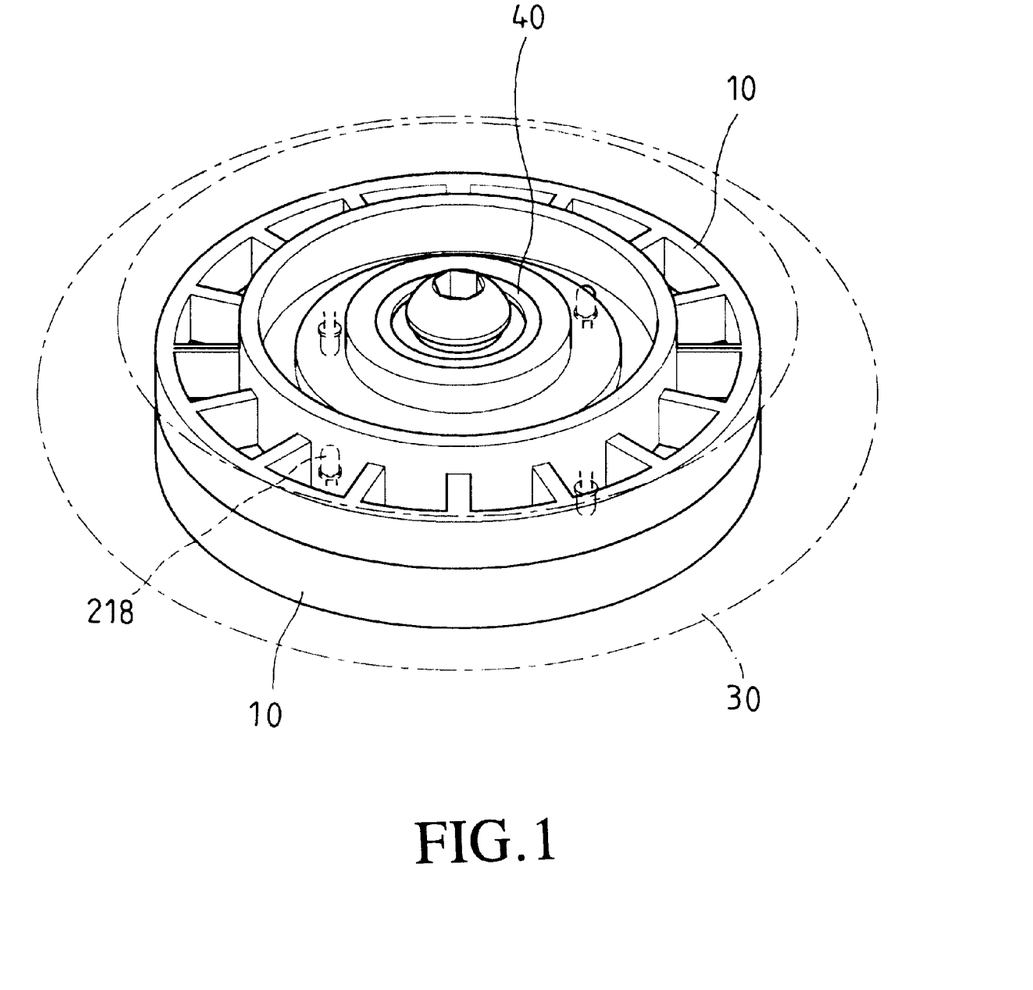
FIG. 1 is a perspective view to show the illuminating wheel of the present invention.
Figure 2:
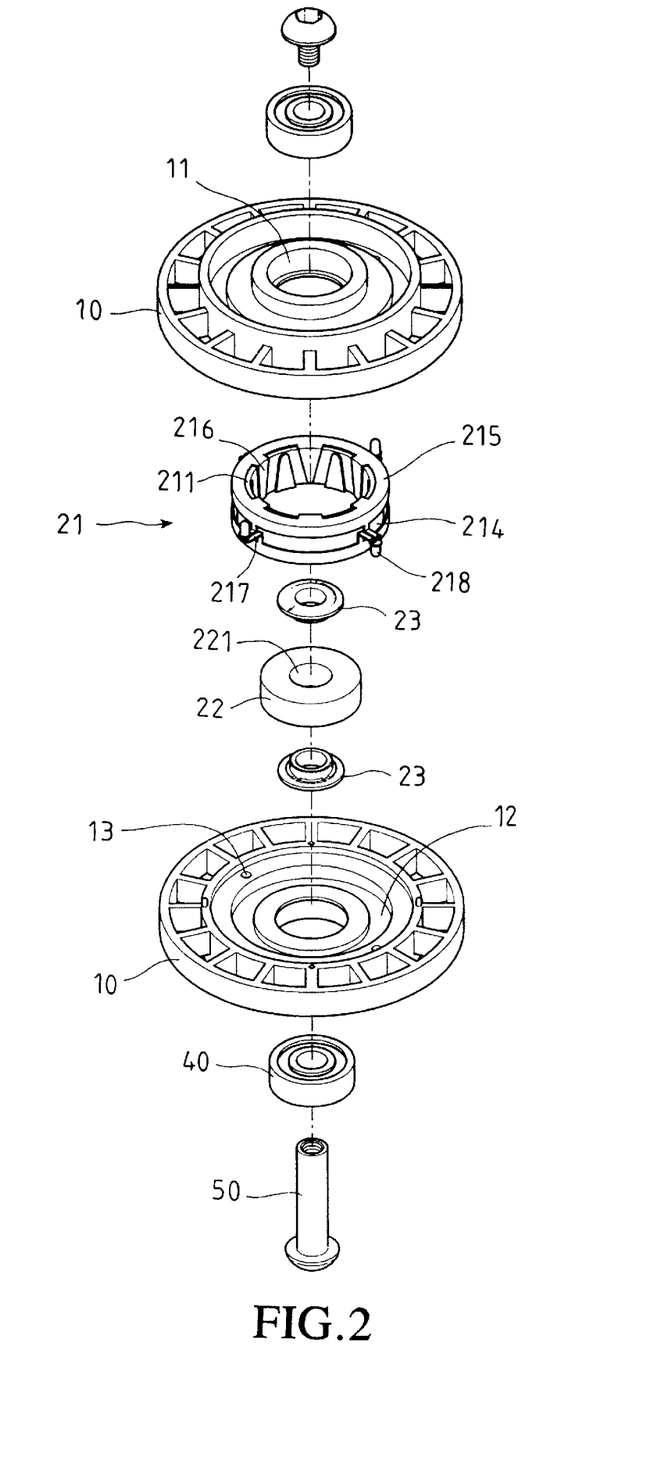
FIG. 2 is an exploded view to show the illuminating wheel of the present invention.
Figure 3:
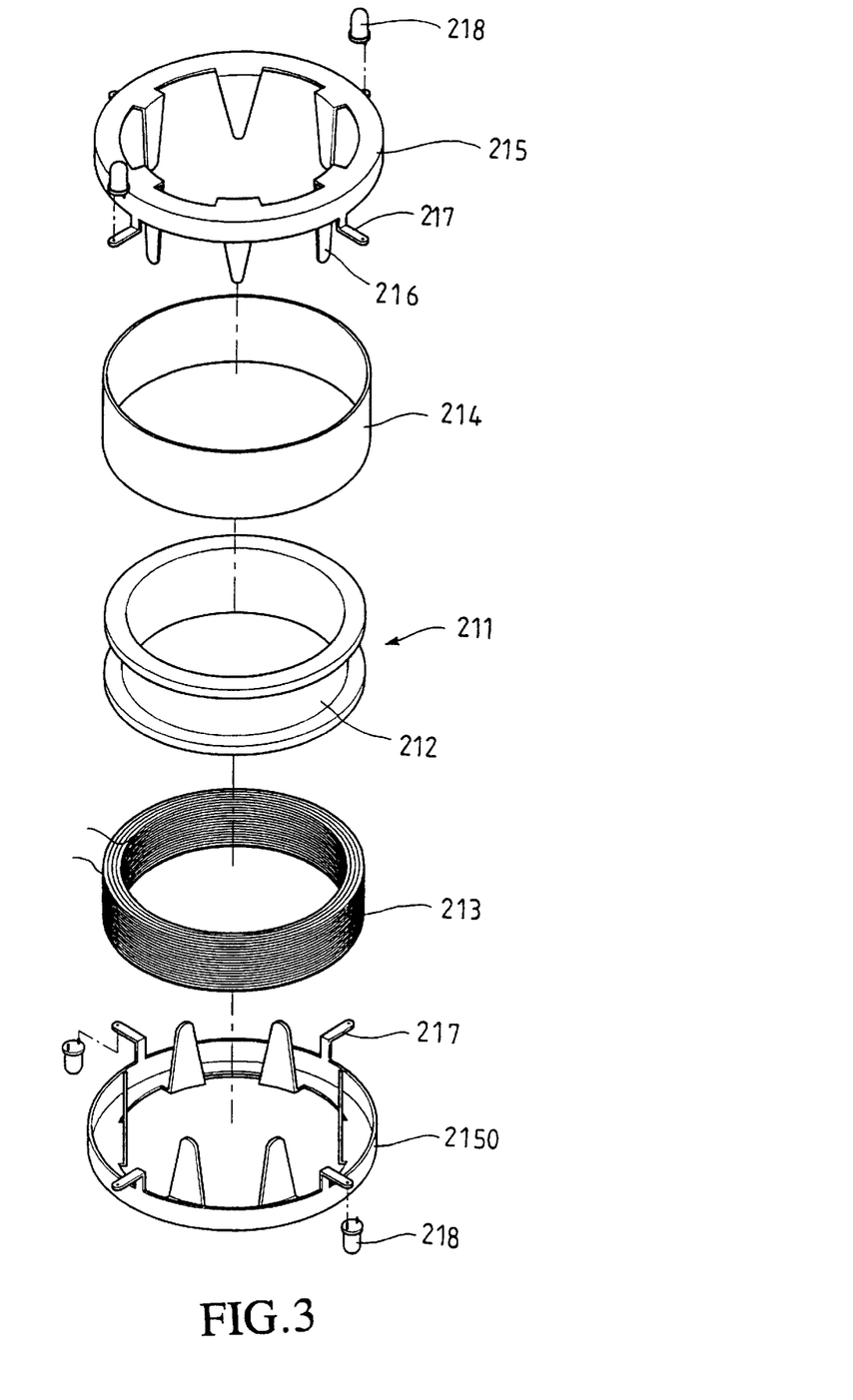
FIG. 3 is an exploded view to show the illuminating assembly in the illuminating wheel of the present invention.
Figure 4:
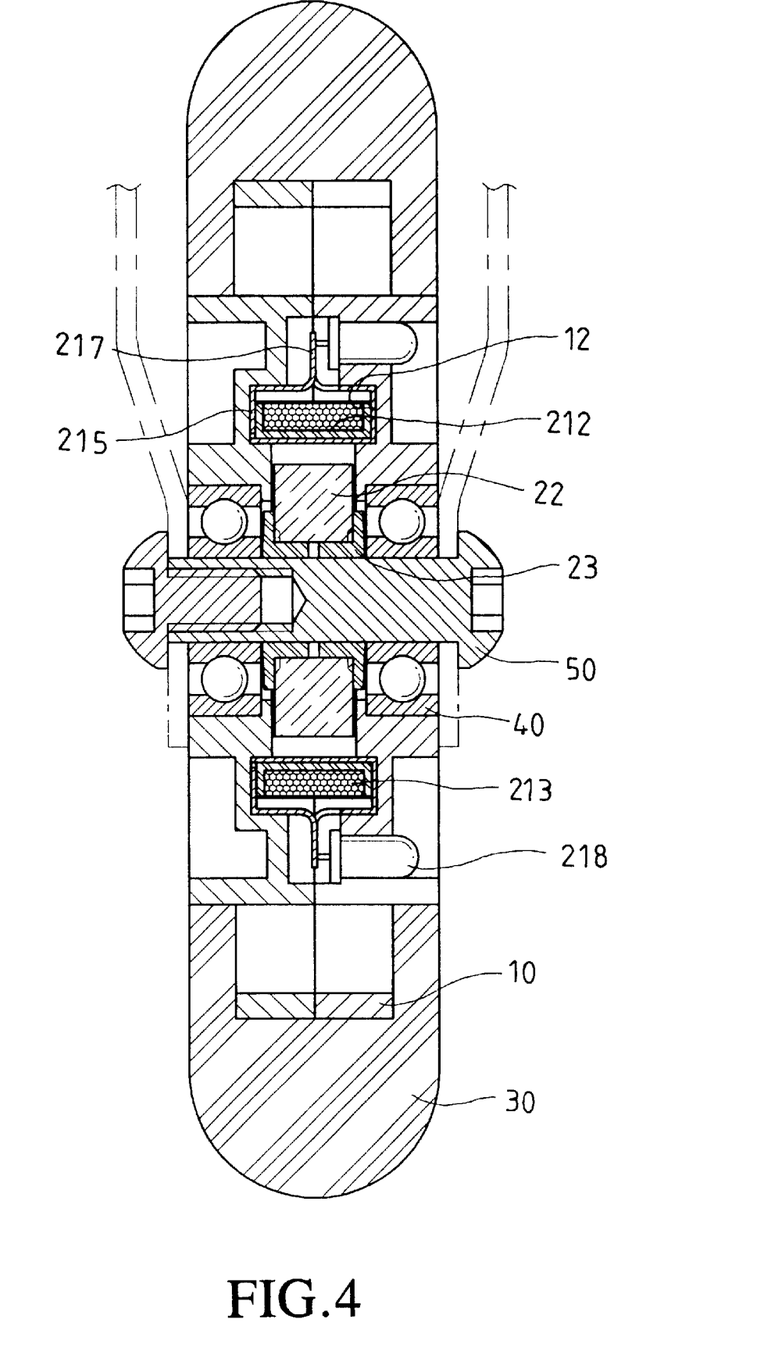
FIG. 4 is a cross sectional view to show the illuminating wheel of the present invention.
Figure 5:
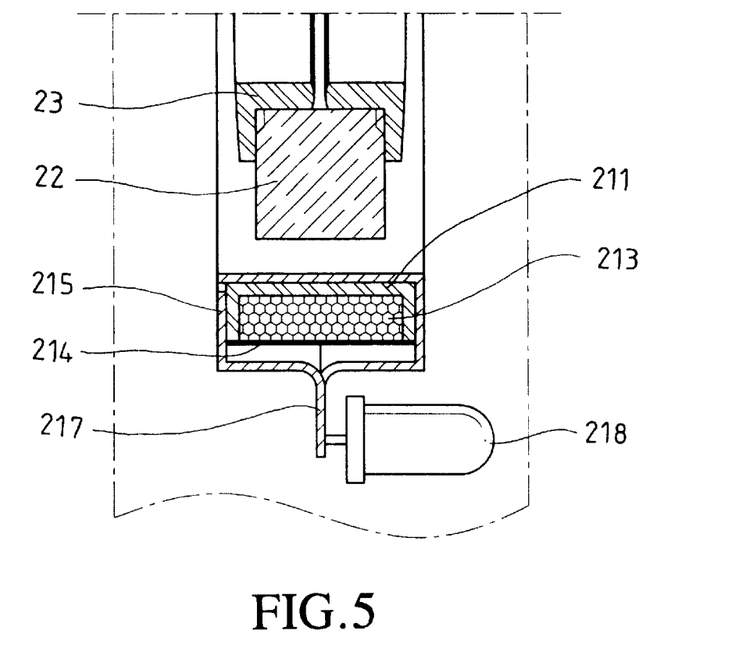
FIG. 5 is an enlarged cross sectional view to show the connection between the illuminating items and the positioning rings.

Referring to FIGS. 1 to 4, the illuminating wheel of the present invention comprises an illuminating assembly 21 comprising a first ring 211 which has an annular groove 212 defined in an outer periphery thereof so as to receive a coil 213 therein, and an isolation member 214 is covered onto the coil 213 to protect the coil 213 from dust and moist. Two positioning rings 215 are respectively engaged with two sides of the first ring 211 wherein an annular surface 2150 extends radially inward from each of the two positioning rings 215 and a plurality of position plates 216 extend transversely from the annular surface 2150 of each positioning rings 215 so that an annular groove is defined between the positioning ring 215, the annular surface 2150 and the position plates 216 of each positioning ring 215. The first ring 211 together with the coil 213 are then received in the two respective grooves. A plurality of extensions 217 extend from each of the two positioning rings 215 and illuminating items 218 are connected to the extensions 217 as shown in FIG. 5. These illuminating items 218 are electrically connected to the coil 213.

Figure 6:
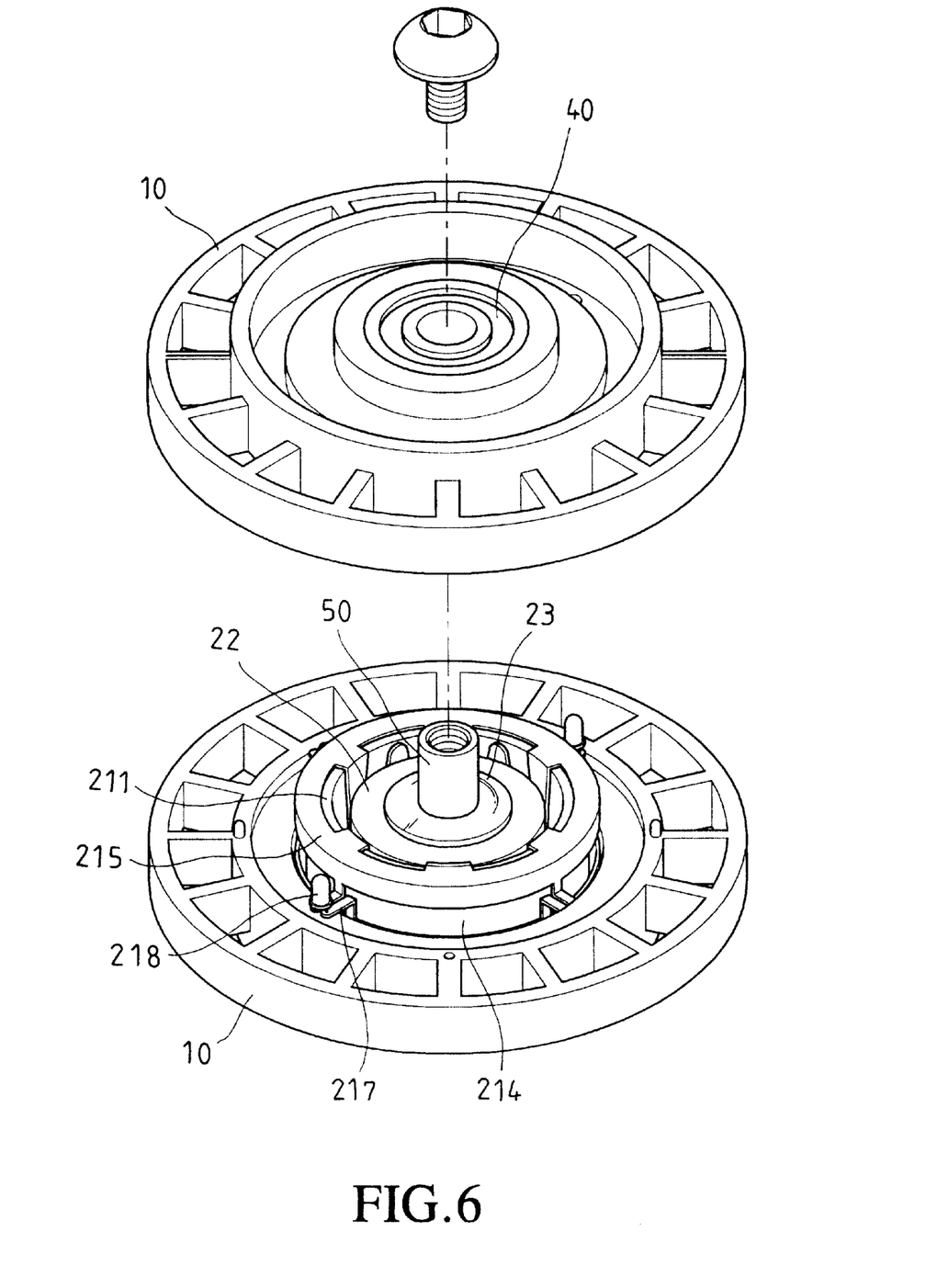
FIG. 6 shows one of the wheel frames is connected to the other wheel frame of the illuminating wheel of the present invention.
Figure 7:
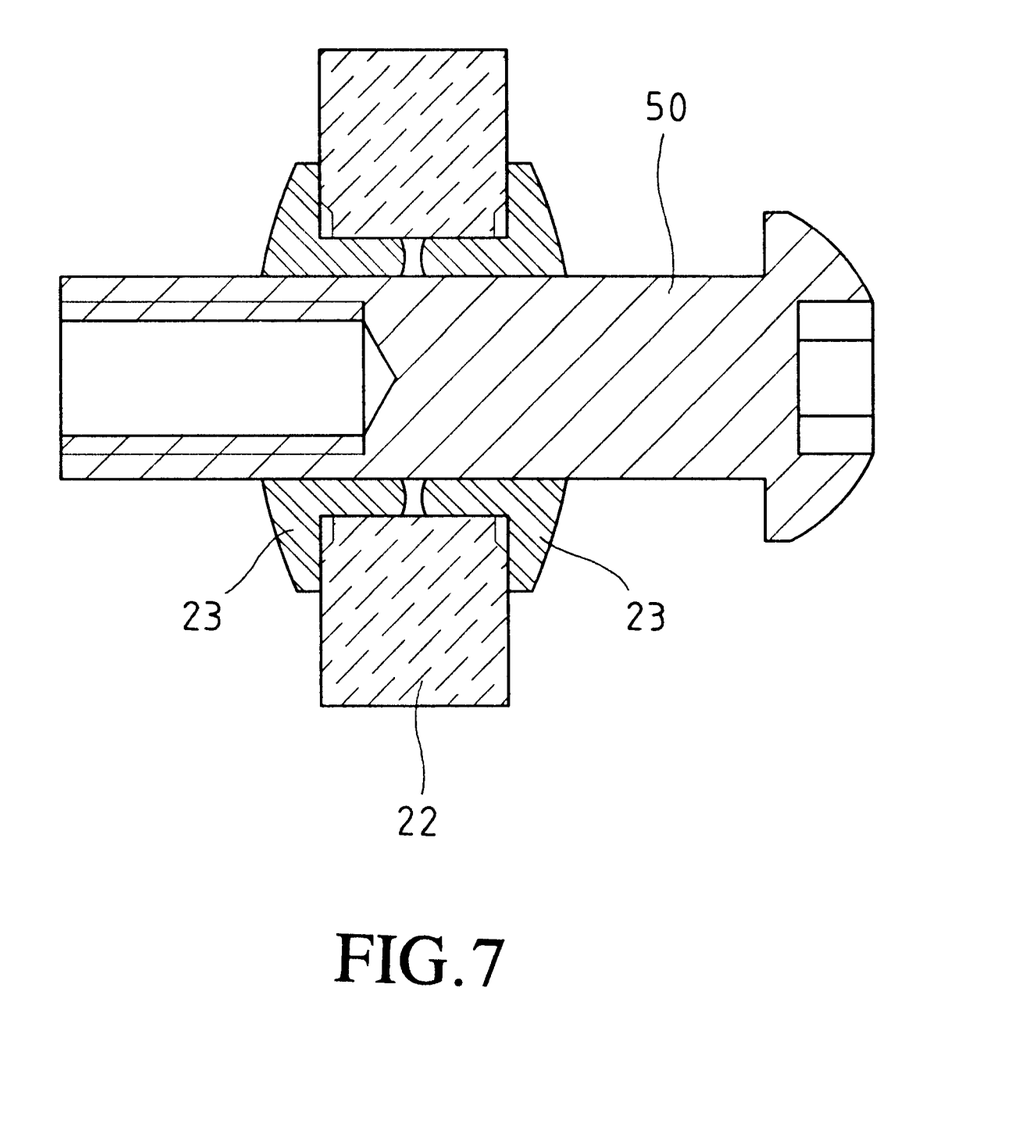
FIG. 7 is a cross sectional view to show a bolt is engaged with an end of the shaft of the illuminating wheel of the present invention.

A ring-shaped magnet 22 has a central hole 221 and two flexible bushes 23 respectively engaged with the central hole 221 from two sides of the ring-shaped magnet 22. The ring-shaped magnet 22 is located between two bearings. Referring to FIGS. 6 and 7, two wheel frames 10 each have a groove 12 for receiving the illuminating assembly 21 and at least one of the two wheel frames 10 has apertures 13 for receiving the illuminating items 218. A wheel 30 is connected to a periphery of the two wheel frames 10. The two bearings 40 are received in two respective second hole 11 of the two wheel frames 10 and a shaft 50 extends through the two flexible bushes 23 and the two bearings 40. A bolt threadedly engaged with one of two ends of the shaft 50 and the two flexible bushes 23 will be deformed and securely engage the shaft 50 with the ring-shaped magnet 22 as shown in FIG. 7. When the wheel 30 is rotated, the ring-shaped magnet 22 is maintained still and the coil 213 is rotated about the ring-shaped magnet 22. The rotational movement of the coil 213 relative to the ring-shaped magnet 22 generates electricity to let the illuminating items 218 light.

Figure 8:
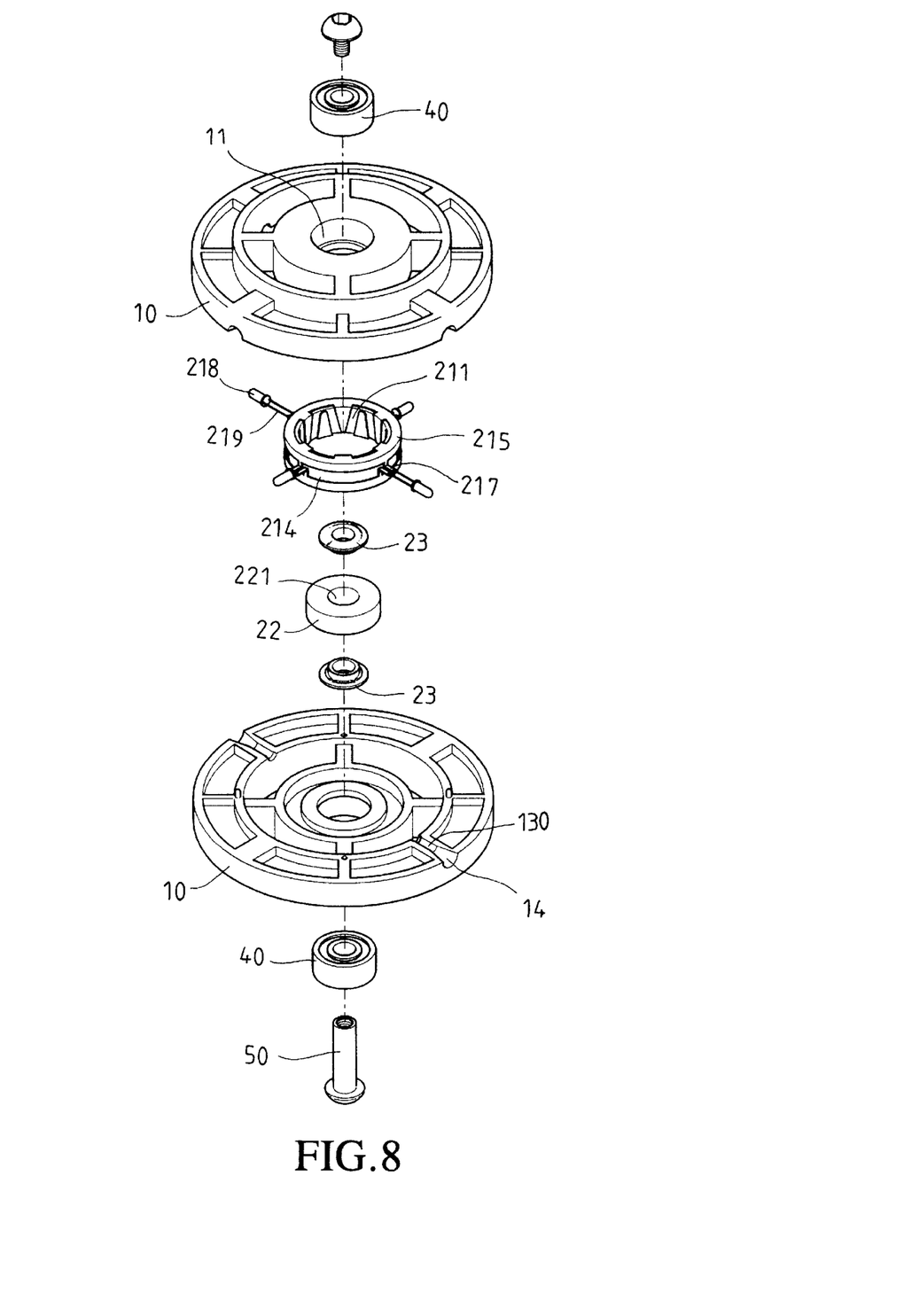
FIG. 8 is an exploded view to show another embodiment of the illuminating wheel of the present invention.
Figure 9:
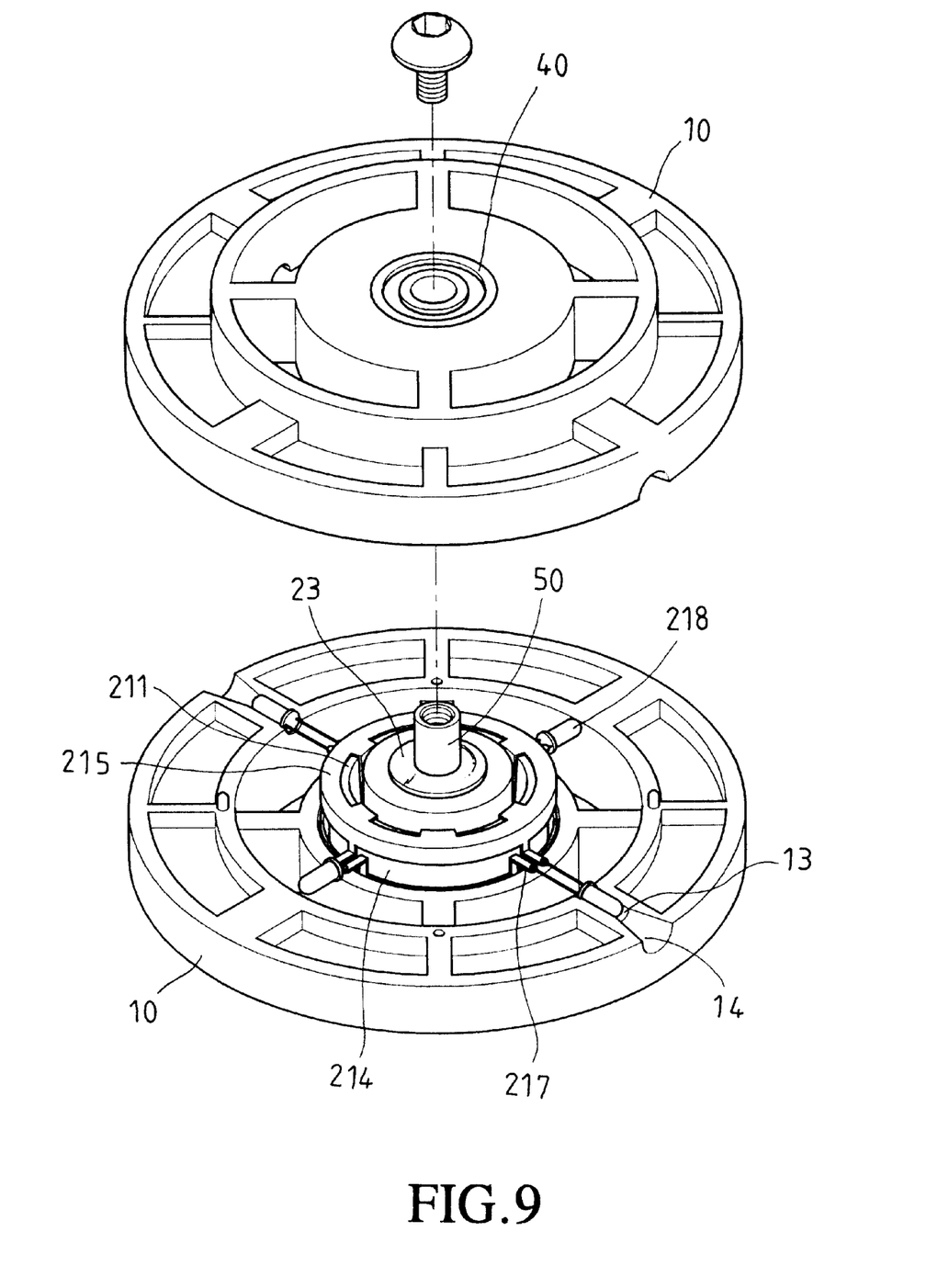
FIG. 9 shows one of the wheel frames is connected to the other wheel frame of the embodiment as shown in FIG. 8 of the illuminating wheel of the present invention.
Figure 10:
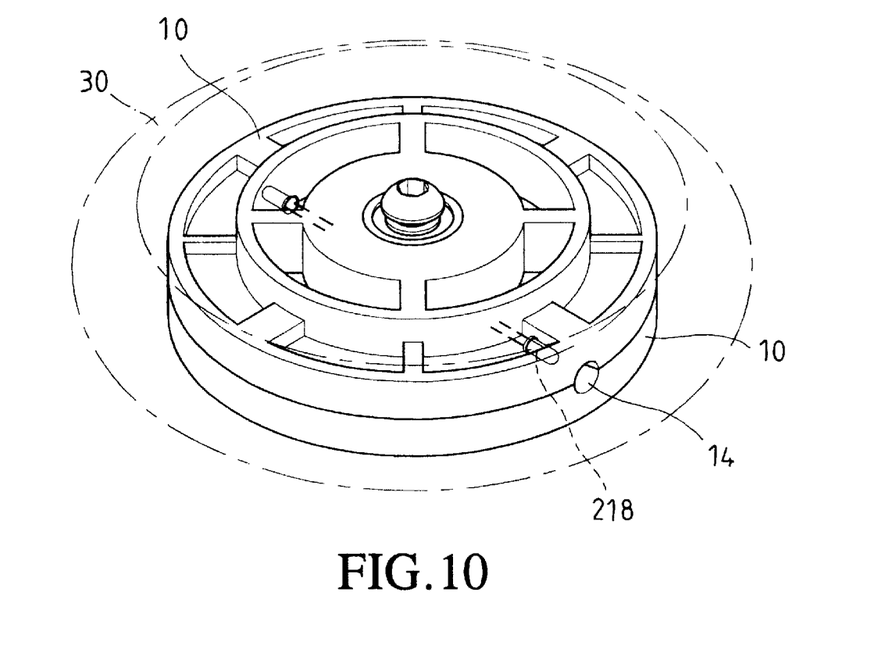
FIG. 10 is a perspective view to show the illuminating wheel as shown in FIG. 8 of the present invention.

FIGS. 8 to 10 show another embodiment of the illuminating wheel wherein each of the wheel frames 3 has radial passages 130 and the illuminating items 218 are received in the radial passages 130. Each of the radial passages 130 has an enlarged section 14 communicating with a peripheral surface of each wheel frame wheel frames 3 so that the range of the light in the enlarged section 14 are more obvious.

While we have shown and described various embodiments in accordance with the present invention, it should be clear to those skilled in the art that further embodiments may be made without departing from the scope and spirit of the present invention.

What is claimed is:

1. A wheel having an illuminating device, comprising:

an illuminating assembly comprising a first ring and a coil mounted to an outer periphery of said first ring, an isolation member covered onto said coil, two positioning rings engaged with two sides of said first ring and a plurality of illuminating items connected to said positioning rings and wired with said coil;

a ring-shaped magnet having a central hole and two flexible bushes respectively engaged with said central hole from two sides of said ring-shaped magnet, said ring-shaped magnet located between two bearings, and two wheel frames each having a second hole and said illuminating assembly positioned between said two wheel frames, said two bearings received in said two second holes of said wheel frames, a shaft extending through said two flexible bushes, at least one of said wheel frames having apertures defined therethrough so that said illuminating items inserted into said apertures.

2. The wheel having an illuminating device as claimed in claim 1 further comprising an annular surface extending radially inward from each of said two positioning rings and a plurality of position plates extending transversely from said annular surface of each positioning rings, an annular groove defined between said positioning ring, said annular surface and said position plates of each positioning ring, said first ring together with said coil being received in said two respective grooves.

3. The wheel having an illuminating device as claimed in claim 1 further comprising a plurality of extensions extending from each of said two positioning rings, said illuminating items connected to said extensions.

4. The wheel having an illuminating device as claimed in claim 1 wherein each of said wheel frames has radial passages and said illuminating items received in said radial passages.

5. The wheel having an illuminating device as claimed in claim 4 wherein each of said radial passages has an enlarged section communicating with a peripheral surface of each of said wheel frames.

* * * * *